(12) United States Patent
Watkins

(10) Patent No.: US 6,901,207 B1
(45) Date of Patent: May 31, 2005

(54) AUDIO/VISUAL DEVICE FOR CAPTURING, SEARCHING AND/OR DISPLAYING AUDIO/VISUAL MATERIAL

(75) Inventor: Daniel Watkins, Saratoga, CA (US)

(73) Assignee: LSI Logic Corporation, Milpitas, CA (US)

(*) Notice: Subject to any disclaimer, the term of this patent is extended or adjusted under 35 U.S.C. 154(b) by 0 days.

(21) Appl. No.: 09/539,686

(22) Filed: Mar. 30, 2000

(51) Int. Cl.$^7$ .................................................. H04N 5/91
(52) U.S. Cl. .......................... 386/83; 386/95; 386/96
(58) Field of Search ............................ 386/46, 83, 95, 386/96, 125, 69; 348/468

(56) References Cited

U.S. PATENT DOCUMENTS

| | | | | |
|---|---|---|---|---|
| 4,857,999 A | * | 8/1989 | Welsh ........................ | 725/22 |
| 5,546,191 A | * | 8/1996 | Hibi et al. ................. | 386/83 |
| 5,703,655 A | * | 12/1997 | Corey et al. ............... | 348/468 |
| 5,731,847 A | * | 3/1998 | Tsukagoshi ................ | 348/589 |
| 5,929,850 A | * | 7/1999 | Broadwin et al. ......... | 725/110 |
| 6,289,163 B1 | * | 9/2001 | Wang ......................... | 386/46 |
| 6,380,978 B1 | * | 4/2002 | Adams et al. .............. | 348/452 |
| 6,385,389 B1 | * | 5/2002 | Maruyama et al. ........ | 386/95 |
| 6,430,357 B1 | * | 8/2002 | Orr ............................. | 386/69 |
| 6,556,193 B1 | * | 4/2003 | Auld et al. ................. | 345/418 |

* cited by examiner

Primary Examiner—Huy Nguyen
(74) Attorney, Agent, or Firm—John R. Ley, LLC

(57) ABSTRACT

An audio/visual (A/V) device, such as a DVD player, assists a user in finding desired programming from among DVD programs, conventional broadcast television (TV) programs and World Wide Web transmitted programs. The programs contain close caption (CC) and A/V content. The A/V device captures and stores the CC and/or A/V content either for current or later manual use by the user or concurrent automatic searching for desired program content or information. Text-based searching is performed on the CC content for a match with user-specified textual search criteria. The audio context is searched for either a change that indicates a change in programming or a match with user-specified audio search criteria. A video still image is captured from the video content for manual viewing or automatic comparison to a desired image. The A/V device also presents the information, including the A/V content, captured CC content and search results, on either a conventional TV or higher resolution progressive monitor.

40 Claims, 6 Drawing Sheets

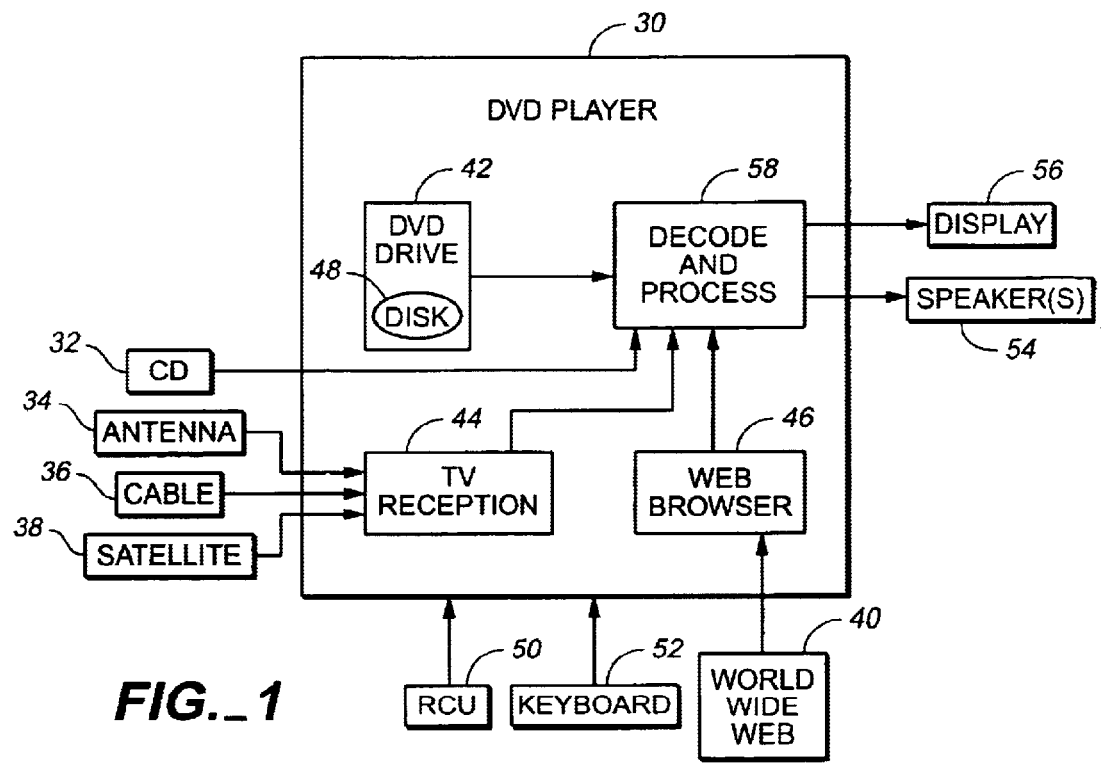
FIG._1
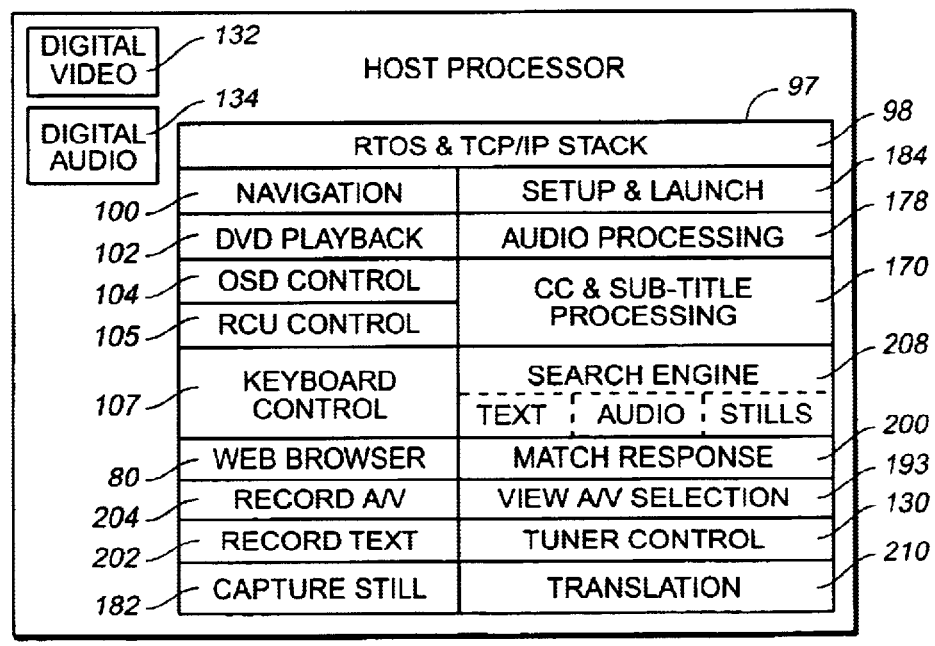
FIG._3

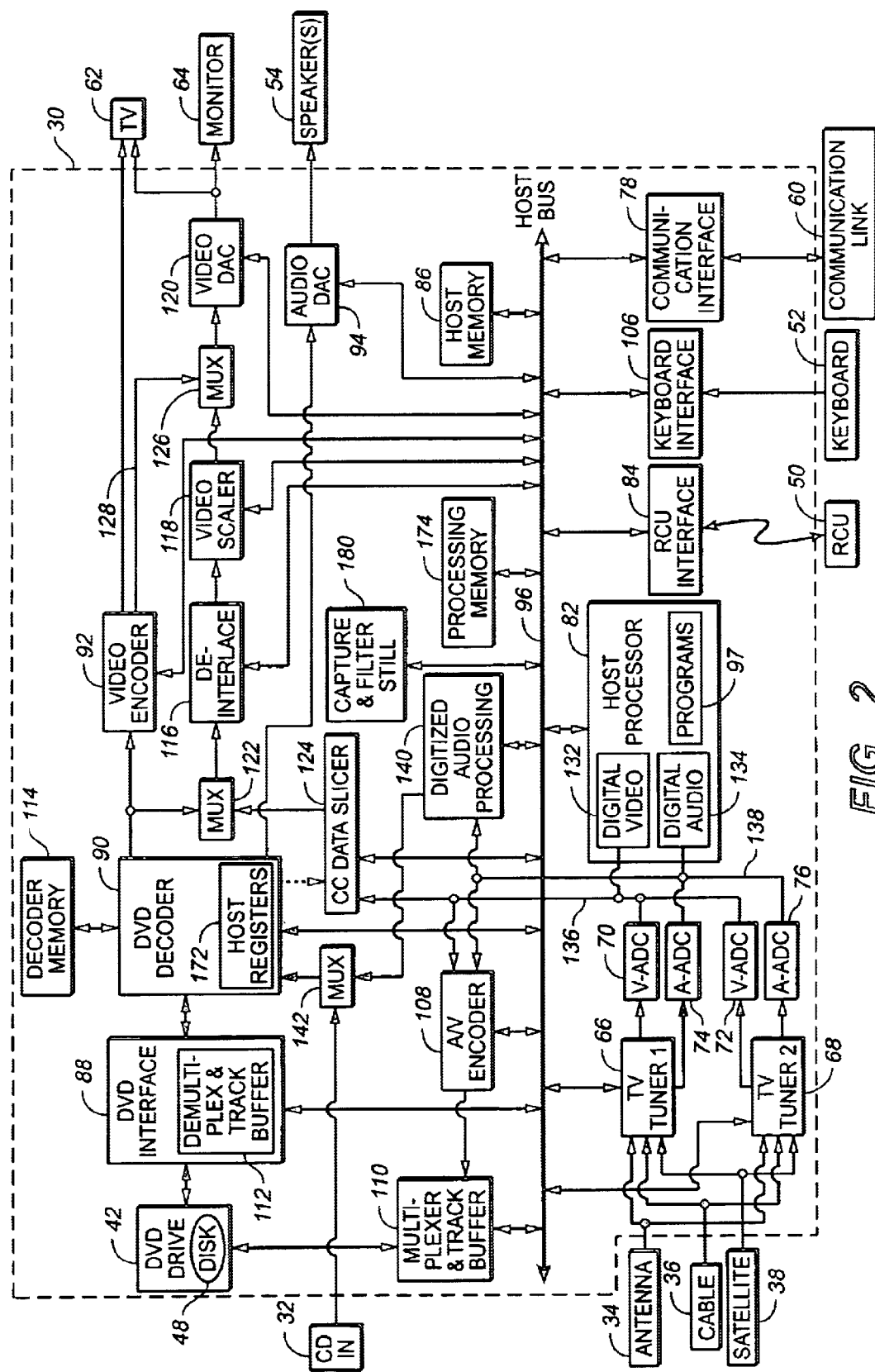
FIG._2

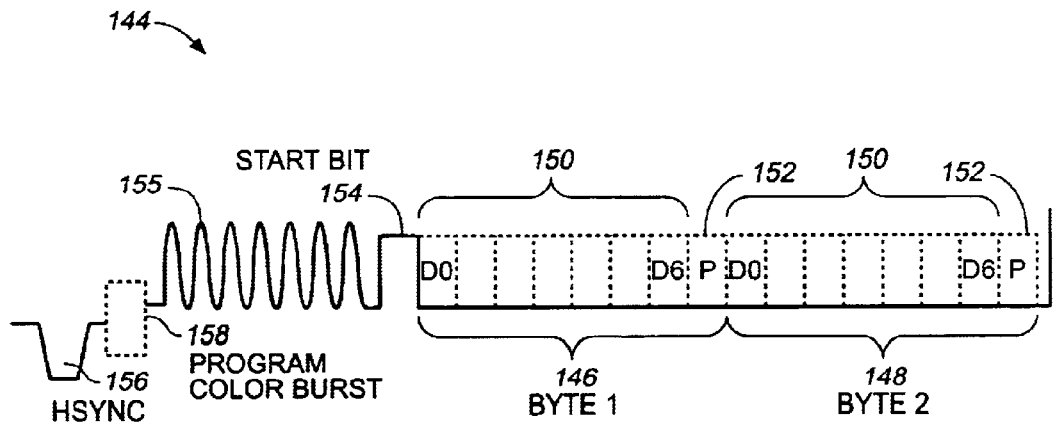
FIG._4
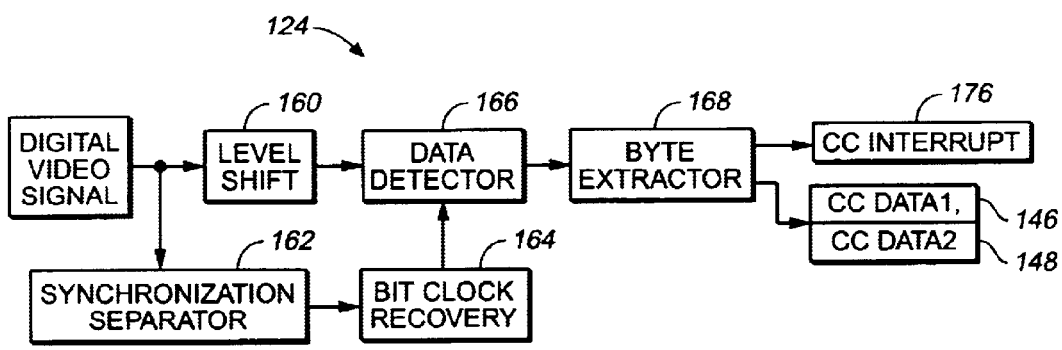
FIG._5

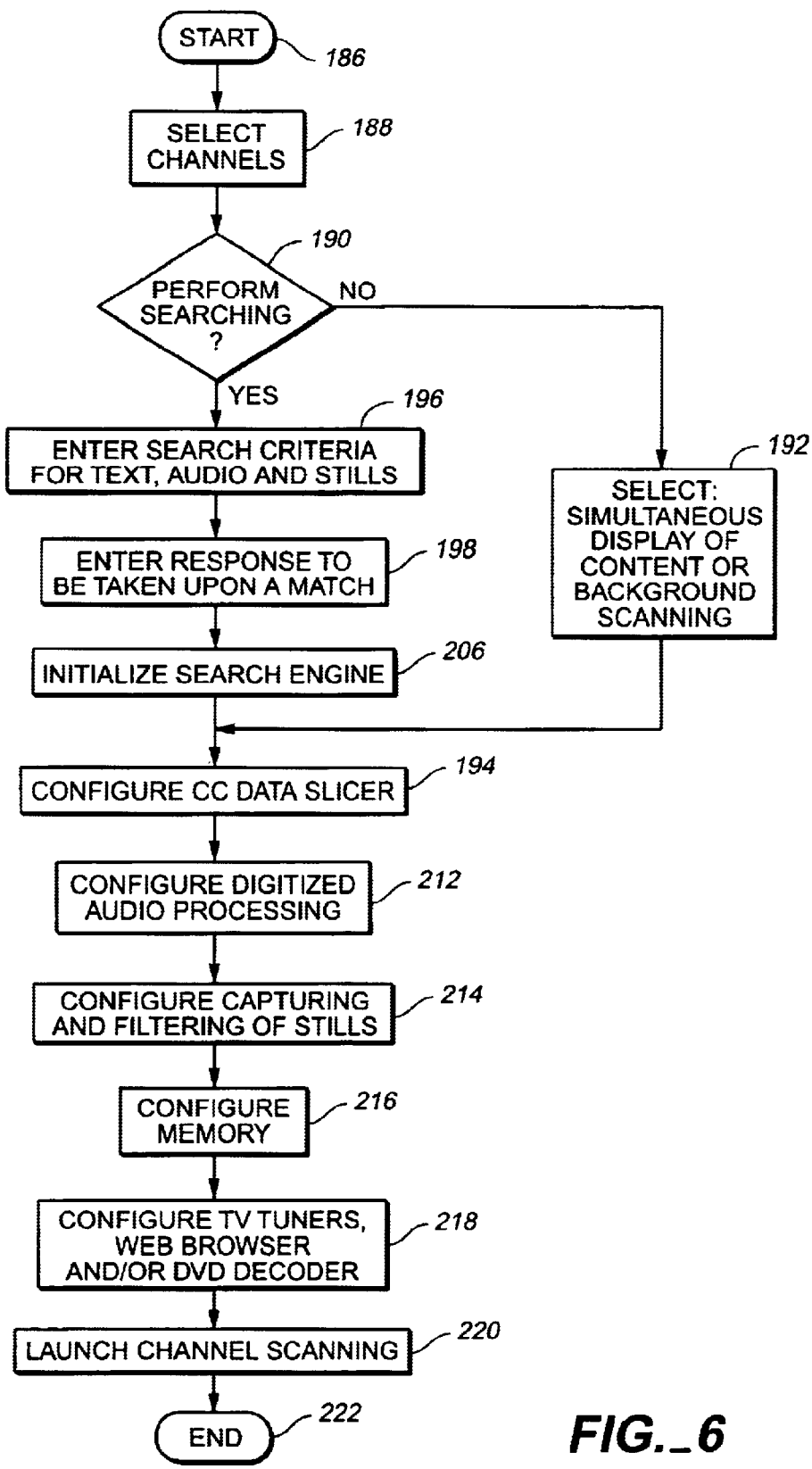
FIG._6

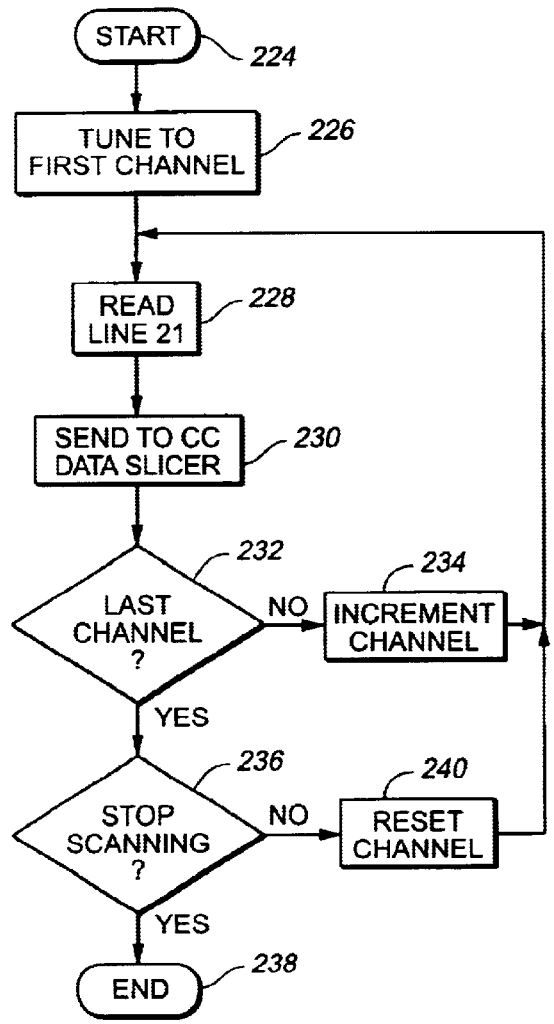
FIG._7
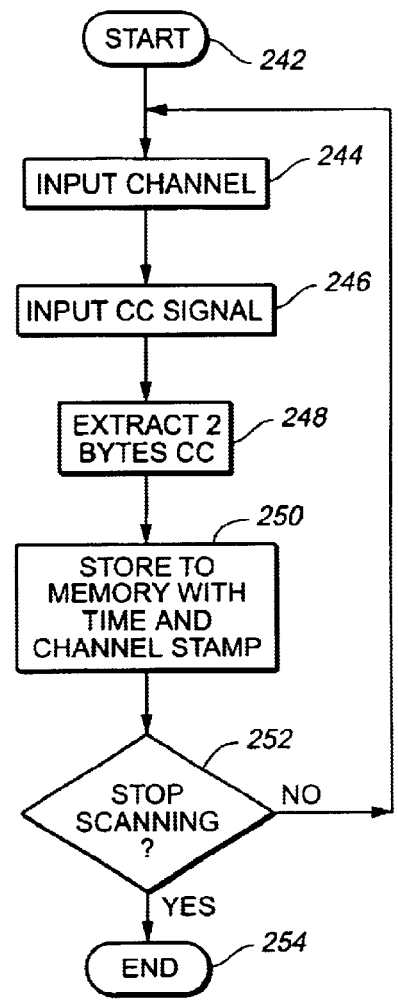
FIG._8

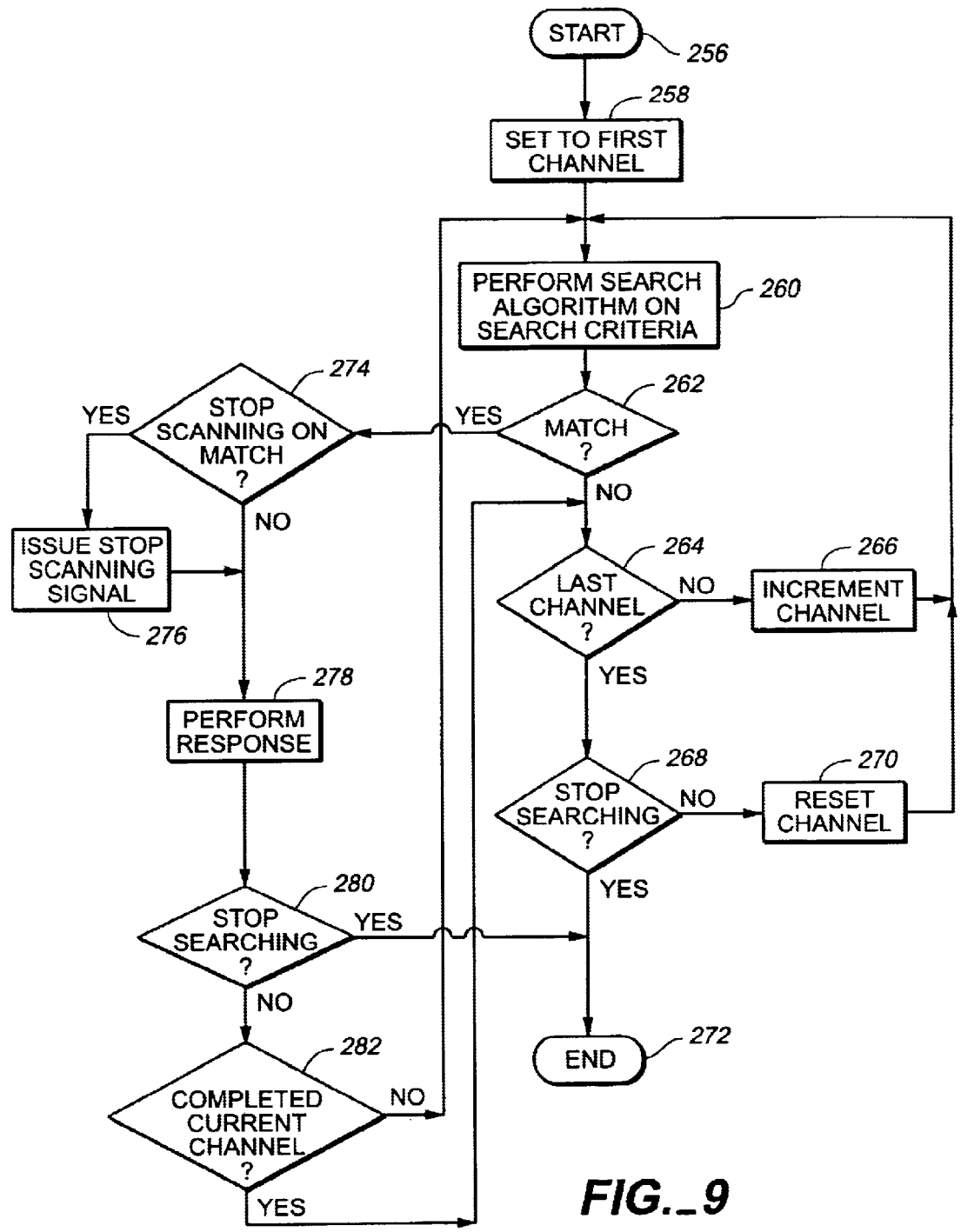
FIG._9

AUDIO/VISUAL DEVICE FOR CAPTURING, SEARCHING AND/OR DISPLAYING AUDIO/VISUAL MATERIAL

FIELD OF THE INVENTION

This invention relates to presentation of audio/visual (A/V) material that preferably includes close captioning (CC) and preferably is from multiple sources, such as broadcast television (TV) programming, digital versatile disks (DVD) programming and World Wide Web broadcast programming. More particularly, the present invention relates to scanning, capturing, storing, searching and displaying the content of the CC and A/V material from the multiple sources to assist a user in finding desired programming or information. An A/V device, according to the present invention, processes the CC and A/V material from multiple sources simultaneously and presents the processed results or the A/V material on a conventional TV or higher resolution progressive monitor.

BACKGROUND OF THE INVENTION

In conventional techniques for a user to find desired A/V content for viewing on a television (TV), the user either reads a program guide or "channel surfs." The program guide provides a very short description of the A/V content that may not be sufficient for the user to determine whether the A/V content is desired or not. Through "channel surfing," the user manually skims through all available A/V content by switching from one A/V channel to the next with a handheld remote control device until a desired program is found. This process is slow and time-consuming and can miss some desired programs if the A/V channel is currently showing a commercial. To record desired programming while the user is away from the TV for later viewing, the user must know the exact channel and time period of the program, so the user must use the program guide to find the desired program, since the user cannot "channel surf" while away from the TV. However, the user can easily miss recording desired programs if they are not adequately described in the program guide or if programming is delayed on the given A/V channel. Another limitation of program guides is that some are regional in nature, providing only local information for A/V channels available through local broadcasts or local cable companies. However, with the use of satellite receivers and World Wide Web based programs, users can receive A/V channels that are not included in local program guides, so some desired programs available through these channels can be easily missed.

Close captioning (CC) has been required to be included in broadcast television (TV) programs in the United States since the 1980's. CC is also included in audio/visual (A/V) content provided on digital versatile disks (DVD), also known as digital video disks. Generally, CC is the readable text of words being spoken in the broadcast program, presented simultaneously on the TV screen with the A/V content. Thus, the CC content usually contains the entire verbal content of the broadcast program in textual format. Typically, the CC content is provided for the benefit of people who are hearing-impaired, for whom the audio content of the broadcast program is of no or limited use. Thus, the CC content is generally received, decoded, displayed and discarded. No further use is made of the CC content.

The CC content provides two bytes at a time within the regular broadcast signal during the horizontal blanking interval of an A/V frame, when no A/V content is being sent. At the standard 30 frames per second for broadcast TV in the United States, therefore, 60 bytes of CC content can be received each second. This rate is relatively slow compared to the processing speed of modem digital circuitry, which is capable of processing digital information at a considerably faster rate. The rate at which CC content is received, however, is fast enough to provide text at a rate that most people can read, which is the primary concern for CC.

With respect to DVD, the DVD standards provide for eight tracks of textual sub-titles, which can be used for providing translations of the words spoken in the DVD content into different languages, but can also be used for typical CC. Again, since the textual content does not need to be provided at a rate faster than most people can read, the sub-title or CC content is provided at a relatively slow rate. Also, the sub-title and CC content is read, decoded, displayed and discarded, as mentioned above.

The DVD content is played by a DVD player, or computer with an installed DVD drive and DVD decoder card. A DVD player or computer is typically under the control of a general purpose host processor with firmware and software that controls the hardware for reading, decoding and displaying the DVD content.

The DVD player typically displays the DVD content on a standard TV. Standard TVs are interlaced monitors that display 60 fields per second (30 frames per second) of video. Standard TVs include those that receive a composite video signal that has 300 horizontal lines of resolution, an S-video standard signal that has 400 horizontal lines of resolution, and an RGB (Red, Green, Blue) component video standard signal that has 476 horizontal lines of resolution. The computer, on the other hand, typically displays the DVD content on a progressive monitor. Progressive monitors are noninterlaced monitors that display 60 frames per second. Progressive monitors that are currently available have higher resolutions than the TVs. Such resolutions typically range from 800×600 (i.e. 800 horizontal×600 vertical pixels) to 1280×1024 and higher.

With the higher resolution, the progressive monitors provide a clearer and sharper image than do the standard TVs. Higher resolution and clearer images are particularly beneficial for displaying textual content, such as the CC or sub-title content, since the lettering is sharper and, therefore, easier to read with less eye strain. Viewing DVD content or broadcast programs on a progressive monitor, however, requires that the user also purchase a computer with the installed DVD equipment and/or TV tuner card. Such expense is typically not justified for simply viewing A/V content. Additionally, progressive monitors for computers typically have a much smaller viewing screen than do standard TVs, with 14 to 17 inches being most common for progressive monitors, but 20 to 35 inches being common for standard TVs. However, prices for progressive monitors continue to decrease, while screen sizes increase.

It is with respect to these and other background considerations that the present invention has evolved.

SUMMARY OF THE INVENTION

An audio/visual (A/V) device finds and provides desired A/V content containing close captioning (CC). The A/V content is received from a variety of sources or A/V channels, including ordinary broadcast programming channels transmitted over airwaves, satellite or cable, DVD content provided on a DVD disk, broadcast programming communicated over the Internet or World Wide Web (the web), or any combination thereof. With user interaction, the A/V device automatically finds desired A/V content from the available sources, primarily by capturing and searching the CC content. The A/V device automatically scans A/V content and searches for the desired A/V content according to search criteria specified by the user. Searches are primarily performed on the CC content using text-based criteria, thereby making greater use of the CC content than is done by merely displaying and discharging the CC content. However, searches for audio-based criteria are also performed on an audio track of the A/V material.

After the CC content is detected, captured and stored, it is searched for certain criteria, such as key words. When the CC content is processed and discarded in a steady stream without storing it, it is possible to search only for single words or criteria. However, since the CC content is stored in the present invention, it can be manipulated in much more complex searching techniques, such as complex groupings of words processed by complex search algorithms. Upon matching the search criteria, a proper response is generated. For example, the user may be prompted with an audible or visible signal and/or part or all of the A/V content may be stored. The stored part of the A/V content will typically include text from the CC content, portions of the audio track and/or portions of the video content, such as video stills or pictures, which the user can view or inspect.

Preferably, the present invention incorporates a DVD player that receives broadcast programming and captures the CC content from the broadcast programming. The A/V content and CC content are preferably played back on a progressive monitor, instead of a standard TV. In this manner, the user's ability to enjoy reading the text and viewing the higher resolution images is enhanced, since the text and images are clearer and sharper with the resolution capabilities of current progressive monitors, but without significantly increasing the cost of the A/V device for performing the playback.

Capturing and storing the CC content achieves several improvements. Since the CC content is received at a relative slow rate for one TV or DVD channel, the CC content of several channels may be simultaneously scanned and stored in realtime. Thus, the user's search criteria can be applied to the CC content of several channels for a more thorough search. Upon a match, the user is alerted, recording a transcript is started, switching to the channel with the matched CC content is performed automatically (either immediately or after a programmed delay that allows the user to view the text first), or the text that was received before and after the matched text is displayed for viewing. Additionally, the user can view the CC contents for multiple channels simultaneously to manually scan or search the CC content. Furthermore, stored CC content can be played back at any rate which suits the user's reading and comprehension speed. Also, the text extracted from the CC content can be stored and indexed in a variety of ways to assist or enable different types of searches for any desired criteria, such as words, phrases, time stamps, originating source, etc.

Audio content is processed by converting the received analog signal into a digital pulse code modulated (PCM) signal at a predetermined sample rate and bit rate. The PCM signals are captured and stored to enable monitoring for certain criteria (e.g. a close match to a predetermined audio clip, changes in the averages signal amplitude which may indicate a change in the broadcast program, etc.).

In addition to capturing textual and audio content, video stills or pictures are optionally captured and stored when the text or audio searches find a match. In this manner, the user can later see what was in the video content at the time of the match in either the textual or audio content. The user can use this information to further determine whether the A/V content was something that the user desired to view. Additionally, the captured stills can be compared to stored images to find close matches, thereby automatically searching the video content, as well as textual and audio content.

These and other improvements are achieved in an A/V device for receiving A/V content via transmitted A/V signals from one or more A/V channels (e.g. broadcast TV, a DVD device and/or a web site). One or more channel receivers (e.g. a TV tuner, a DVD decoder and/or a web browser) selectively receive the transmitted A/V signals from the respective A/V channels and convert the transmitted A/V signals into digital A/V signals, if not already in a digital format. A video display circuit receives a video portion of the digital A/V signals from a selected one of the channel receivers and converts the video portion into a display signal and outputs the display signal. A content capture until receives a portion of the digital A/V signals, captures part of the digital A/V signals and outputs the captured part of the digital A/V signals. The content capture unit comprises either a CC data slicer that extracts CC content, a digitized audio capturing unit that filters audio content, a video still image capture until that filters still images of the video content or a combination thereof. A captured content storage unit, such as a memory device, receives the captured part of the digital A/V signals from the content capture unit and stores the captured part in memory.

It is preferable that the CC data slicer receives a video portion of the digital A/V signal and extracts and captures a CC content part of the video portion, the digitized audio capturing unit receives an audio portion of the digital A/V signal and captures a part of the audio portion, and the video still image capture unit receives the video portion of the digital A/V signal and captures a video still image part of the video portion. Additionally, the channel receivers preferably scan through a plurality of selected channels and send at least a portion of the digital A/V signals for each selected channel to the content capture unit to capture part of the digital A/V signals for each selected channel. Additionally, it is preferable that a search engine receives and searches through the captured part of the digital A/V signals for each selected channel to locate a match with user search criteria. The user search criteria is preferably one or more of: a textual criteria related to the CC content, audio criteria related to the audio portion, and video criteria related to the video still image.

Response instructions are preferably to be followed upon the location of a search match. The response instructions are preferably to provide a visible alert signal, to provide an audible alert signal, to begin displaying the A/V content from the selected channel in which the match was located, to display the CC content part from the selected channel in which the match was located, to capture a video still image by the video still image capture unit from the video portion of the digital A/V signal of the selected channel in which the match was located, to record the A/V content of the selected channel in which the match was located, and/or to record the CC content part of the selected channel in which the match was located.

It is further preferable that the video display circuit also comprises a video output connection for a progressive monitor and a progressive monitor video encoding circuitry. The progressive monitor video encoding circuitry preferably de-interlaces the digital video signal if necessary, scales the video to the pixel resolution of the progressive monitor and converts the digital video signal into an analog signal for display on the progressive monitor.

The previously mentioned and other improvements are also achieved in a method of processing A/V content wherein an A/V signal is received from an A/V channel, a portion of the A/V signal is captured, and the captured portion is stored. The captured portion of the A/V signal includes CC content, audio content and/or a video still image.

Additionally, the method preferably scans through a plurality of A/V channels. Thus, the A/V signal is received from each of the A/V channels, and the captured portion of the A/V signal is captured from each of the A/V channels. The captured portion of the A/V signals from each of the A/V channels is preferably searched to locate a match with user search criteria. The user search criteria is preferably textual criteria related to the CC content, audio criteria related to the audio content and/or video criteria related to the video still image. Upon a match between search criteria and an A/V channel, an appropriate response is performed, such as providing an alert signal, displaying or recording the A/V content to the matched channel, displaying or recording the CC content of the matched channel and/or capturing a video still image from the matched channel. Additionally, the A/V channels preferably comprise at least one of a DVD source, a broadcast programming source and a web programming site.

Additionally, the method preferably selects video encoding from between a PAL/NTSC video encoder and a progressive monitor video encoder. The progressive monitor video encoder preferably de-interlaces and scales the A/V signal for the screen resolution capabilities of a progressive monitor.

The previously mentioned and other improvements are also achieved in a DVD player that also receives broadcast TV programming. The DVD player includes a TV tuner as well as conventional DVD circuitry, both of which feed into video encoding circuitry for presentation of A/V content on a display. Thus, the presented A/V content is selected from among multiple broadcast TV programs and installed DVD content.

Additionally, the DVD player preferably further comprises a second broadcast TV tuner. Both TV tuners provide a selected TV program to the video encoding circuitry. The video encoding circuitry selects the presented A/V content from among the two selected TV programs and the DVD content.

The previously mentioned and other improvements are also achieved in a DVD player for playing back a digital video signal on a conventional television or progressive monitor. The DVD player comprises a source of the digital video signal and a video encoding circuit. The video encoding circuit comprises a video encoder, a de-interlacing unit, a video scaler and a video DAC. The video encoding circuit receives the digital video signal and provides the digital video signal to a selected one of either the video encoder or the de-interlacing unit. When the digital video signal is provided to the video encoder, the video encoder encodes the digital video signal into a conventional television signal and provides the conventional television signal to the conventional television. When the digital video signal is provided to the de-interlacing unit, the de-interlacing unit de-interlaces the digital video signal into a progressive video signal. The video scaler scales the progressive video signal into a scaled video signal. The video DAC converts the scaled video signal into a display signal and provides the display signal to the progressive monitor.

Additionally, the conventional television signal preferably has a resolution (i.e. horizontal lines of resolution of pixel-by-pixel resolution) that is equal to or less than the original resolution of the digital video signal, whereas the display signal provided to the progressive monitor preferably has a resolution that is equal to or greater than the original resolution of the digital video signal. It is further preferable that the source of the digital video signal comprises a DVD source and a conventional broadcast television source.

The previously mentioned and other improvements are also achieved in a DVD player for playing back an A/V signal. The DVD signal comprises a source of the A/V signal, at least one content capture unit and a storage unit. The A/V signal includes CC content, audio content and video content. Each content capture unit receives at least a portion of the A/V signal and captures therefrom a part of the A/V signal, such as CC content, audio content and/or a still image from the video content. The storage unit receives the captured part of the A/V signal from each content capture unit and stores the captured part of the A/V signal in memory.

A more complete appreciation of the present invention and its scope, and the manner in which it achieves the above noted improvements, can be obtained by reference to the following detailed description of presently preferred embodiments of the invention taken in connection with the accompanying drawings, which are briefly summarized below, and the appended claims.

BRIEF DESCRIPTION OF THE DRAWINGS

FIG. 1 is a block diagram of a DVD player embodying the present invention, shown connected to input devices, such as a compact disk, antenna, cable, satellite, the World Wide Web (the web), a remote control unit (RCU) and a keyboard, and output devices, such as speakers and a display.

FIG. 2 is a more detailed block diagram of the DVD player and the input and output devices shown in FIG. 1, but with alternative display devices.

FIG. 3 is block diagram of a host processor, as incorporated in the DVD player shown in FIGS. 1 and 2, showing exemplary programs running thereon and audio/visual outputs.

FIG. 4 is an illustration of a typical analog close captioning (CC) signal for processing by the DVD player shown in FIGS. 1 and 2.

FIG. 5 is a block diagram of a CC data slicer of the DVD player shown in FIG. 2.

FIG. 6 is a flow chart showing a procedure for setting up and launching functions, including capturing and searching, of the DVD player shown in FIGS. 1 and 2.

FIG. 7 is a flow chart showing a procedure implemented by the DVD player shown in FIGS. 1 and 2 to scan multiple channels and separate out raw information relating to CC for each channel.

FIG. 8 is a flow chart showing a procedure implemented by the DVD player shown in FIGS. 1 and 2 to extract and store CC content from the raw information obtained in executing the procedure shown in FIG. 7.

FIG. 9 is a flow chart showing searching for audio/visual content in the DVD player shown in FIGS. 1 and 2.

DETAILED DESCRIPTION

A DVD player or audio/visual (A/V) device 30, which embodies the present invention, is connected to various content source inputs, user input devices and playback output devices attached thereto as shown in FIG. 1. The content source inputs include a compact disk input (CD IN) 32, an antenna 34, a cable 36, a satellite link 38 and the World Wide Web (the web) 40. The DVD player 30 has the standard DVD capabilities as well as additional capabilities to receive and playback A/V content in accord with the present invention. The DVD player 30 receives the A/V content from various A/V channels, including not only a DVD source, but also braodcast television (TV) programming and web broadcast programming. The DVD player 30 accesses compressed DVD content stored on a DVD disk 48 through a DVD drive 42. The DVD player 30 accesses the broadcast TV programming from the antenna 34, the cable 36 and the satellite link 38 through TV reception circuitry 44. Additionally, the DVD player 30 accesses the web broadcast programming from the web 40 through a web browser 46.

The user input devices include a remote control unit (RCU) 50 and a keyboard 52 for a user to input data to and control the DVD player 30. The playback output devices include one or more speakers 54 for playing back audio content and a display 56 for playing back video content. The display 56 is a standard TV high definition TV (HDTV), progressive monitor or other suitable display device. Thus, as will be described below, the DVD player 30 provides video signals for controlling, not only standard TVs and HDTVs, but also progressive monitors.

The DVD player 30 includes decoding and processing hardware and software 58 connected to the DVD drive 42, the TV reception circuitry 44 and the web browser 46 to receive close captioning (CC) content, audio content and video content from the A/V channels. The decoding and processing hardware and software 58 receives, captures, stores and processes the CC content, from each of the A/V channels that provides CC content, to assist the user in finding desired programming. The decoding and processing hardware and software 58 also processes portions of the audio content and the video content received through each of the A/V channels to further assist the user in finding desired programming.

The RCU 50 is preferably an infrared handheld device with various navigation and command buttons (not shown) for the user to press to interact with the DVD player 30. The keyboard 52 is preferably a wireless infrared keyboard with at least the standard alphanumeric keys, but also special function keys as are appropriate. The buttons and keys of the RCU 50 and keyboard 52 may be combined into a single user input keyboard/RCU.

The compact disk input 32 provides compact disk audio content for playback through the DVD player 30. The antenna 34, cable 36, satellite link 38 and the web 40 provide broadcast programming, such as standard broadcast TV programming, or video-on-demand for playback through the DVD player 30.

A more detailed block diagram of the DVD player 30 (FIG. 1) is shown in FIG. 2. The content source inputs include not only the CD input 32, the antenna 34, the cable 36 and the satellite link 38 as shown in FIG. 1 but also a communication link 60, such as a telephone line or network cable, for connecting to the web 40 (FIG. 1).

A standard TV 62 and a progressive monitor 64 are shown in place of the generic display 56 (FIG. 1), since separate pathways are provided for the video output signals to each type of display 56 (TV 62 and progressive monitor 64). Typically, the TV 62 is an interlaced monitor that displays 60 interlaced video fields per second (30 frames per second). The TV 62 is a conventional TV or HDTV that receives a standard composite video signal that typically has 300, 400 or 476 horizontal lines of resolution. The progressive monitor 64 is the type of noninterlaced display that is typically used with a computer, or PC, and includes the standard pixel resolutions available for Video Graphics Adapter (VGA), Super VGA (SVGA) and other appropriate PC monitors. Such pixel resolutions for progressive monitors are greater than those for TVs and HDTVs and are currently common up to 1280×1024 pixels. Succeeding generations of progressive monitor products continue to have greater pixel resolutions available. Additionally, such a progressive monitor 64 displays 60 noninterlaced frames per second, or twice the display rate of the typical TV 62. With the higher resolutions and faster display rates of the progressive monitors, clearer and sharper images may be displayed on the progressive monitor 64 than on the TV 62.

Generally, the TV reception circuitry 44 shown in FIG. 1 corresponds to TV tuners 66 and 68, video analog-to-digital converters (ADCs) 70 and 72 and audio ADCs 74 and 76. Also, the web browser 46 shown in FIG. 1 generally corresponds to a communication interface 78 (such as a modem or network interface card) and a web browser program 80 (FIG. 3) running on a host processor 82.

The DVD player 30 includes conventional elements, such as the host processor 82, an RCU interface 84, a host memory RAM 86, the DVD drive 42 and disk 48, a DVD drive interface 88, a DVD decoder 90, a video encoder 92 and an audio digital-to-analog converter (DAC) 94. The DVD drive 42, drive interface 88 and decoder 90 comprises a conventional receiver for the DVD content. A host bus 96 generally provides an interconnection between most of the elements of the DVD player 30 for exchanging data and control signals therebetween. The conventional elements cooperate and function with other nonstandard elements of the DVD player 30 as described herein.

The host processor 82 runs programs 97 that control the operation of the DVD player 30, including conventional programs, some of which cooperate and function with nonstandard features of the DVD player 30. Exemplary conventional and nonstandard programs are shown in FIG. 3 and will be described with reference to the block diagram of FIG. 2 and the subsequently described procedures. For example, a real-time operating system (RTOS) 98 includes a Transport Control Protocol/Internet Protocol (TCP/IP) slack to enable Internet and web communications through the communication interface 78 and the communication link 60. A navigation program 100 coordinates most of the functions of the DVD player 30, so the navigation program 100 typically requires interaction with the other programs 97. A DVD playback program 102 controls the playback of DVD content from the DVD disk 48 through the drive interface 88 and the DVD decoder 90. An on-screen-display (OSD) control program 104 controls presentation of information and menus to the user by overlaying such information on the A/V content that is being played back on the TV 62 or monitor 64. An RCU control program 105 accepts user input commands from the RCU 50 and sends the commands to other programs 97 to control the functions of the DVD player 30. Other programs running on the host processor 82 will be described below.

Generally, the RCU interface 84 wirelessly receives the user input commands from the RCU 50. The RCU interface 84 preferably connects to the host bus 96 to send the commands to the host processor 82. Additionally, the user can input commands and data with the keyboard 52 through a keyboard interface 106 which is connected to the host bus 96 to send user keyboard input to the host processor 82 under the control of a keyboard control program 107.

The host memory RAM 86 generally comprises memory for storing information and connects to the host bus 96 to exchange the information with the host processor 82. The host memory RAM 86 provides storage for the programs 97 and data being run or operated upon by the host processor 82.

The DVD disk 48 contains the DVD content to be played back on the TV 62 or monitor 64. The DVD drive 42 reads a DVD-encoded bitstream for the DVD content from the DVD disk 46 and sends the DVD-encoded bitstream to the DVD drive interface 88. In the optional case that the DVD disk 48 and DVD drive 42 support a re-writable DVD disk 48, the DVD drive 42 receives encoded DVD content from an A/V encoder 108 through a multiplexer and track buffer 110 and stores the encoded DVD content on the DVD disk 48.

The DVD drive interface 88 receives the DVD-encoded bitstream from the DVD drive 42 and de-multiplexes and stores the DVD-encoded bitstream in a de-multiplexer and track buffer 112 prior to sending the DVD-encoded bitstream to the DVD decoder 90. The DVD drive interface 88 connects to the DVD decoder 90, not only for sending the DVD-encoded bitstream to the DVD decoder 90, but also for exchanging control signals therewith. The DVD drive interface 88 also connects to the host bus 96 for sending and receiving control and status signals to/from the host processor 82.

The DVD decoder 90, such as the L64020 or L64021 DVD decoders available from LSI Logic, Inc., receives the DVD-encoded bitstream from the DVD drive interface 88 and separates, decompresses and/or decodes the DVD-encoded bitstream into the various types of conventional DVD content, such as textual data, programming data, digital video content and digital audio content. The DVD standards provide for a pixel resolution for A/V content up to 720×480 pixels (720 horizontal lines of resolution) with a display rate of 60 interlaced video fields per second (30 frames per second). The DVD decoder 90 is attached to the host bus 96 for communication with the control by the host processor 82. A decoder memory RAM 114 is connected to the DVD decoder 90 to support the functioning of the DVD decoder 90.

The audio DAC 94 receives the decoded digital audio content, typically a streaming pulse code modulated (PCM) signal, from the DVD decoder 90 and converts the PCM signal into an analog signal that can be played on the speakers 54. The audio DAC 94 connects to the host bus 96 to exchange control and initialization signals with the host processor 82 to enable proper handling of the decoded digital audio content.

The video encoder 92 receives the decoded digital video content from the DVD decoder 90 and encodes it for display in either the National Television Systems Committee (NTSC) composite color-encoding system typically used in the United States or the Phase Alternate Line (PAL) composite color-encoding system typically used in Europe. For either of these composite color-encoding systems, the video encoder 92 must reduce the pixel resolution from the DVD standard 720 horizontal lines of resolution to 300, 400 or 476 horizontal lines of resolution, depending on whether the TV 62 supports the standard composite video signal that has 300 horizontal lines of resolution, the S-Video standard signal that has 400 horizontal lines of resolution, or the RGB (Red, Green, Blue) component video standard signal that has 476 horizontal lines of resolution, respectively.

To utilize the full resolution capabilities of DVD content, rather than reducing the resolution of the DVD content to fit the capabilities of the TV 62, the DVD player 30 incorporates a second video encoding circuitry, including a de-interlacing unit 116, a video scaler 118 and a video DAC 120, to playback the DVD content on the progressive monitor 64. The de-interlacing unit 116, the video scaler 118 and the video DAC 120 connect to the host bus 96 to exchange control and programming signals with the host processor 82, so that the correct video signal will be provided to the monitor 64. The de-interlacing unit 116, the video scaler 118 and the video DAC 120 are, thus, programmed with the pixel resolution of the original interlaced digital video signal and/or the pixel resolution of the progressive monitor 64, so that the original interlaced digital video signal can be converted to the proper signals for playback on the progressive monitor 64.

The de-interlacing unit 116 receives the original interlaced digital video signal through a multiplexer (MUX) 122 from either the DVD decoder 90 or a CC data slicer 124 (described below). The multiplexer 122 operates under the control of the host processor 82 to select the source (the DVD decoder 90 or CC data slice 124 or a blended combination thereof) for the original interlaced digital video signal to be provided to the de-interlacing unit 116.

The de-interlacing unit 116 converts the original interlaced digital video signal (interlaced 60-fields-per-second) to a progressive 60-frames-per-second video signal and provides the progressive video signal to the video scaler 118. The video scaler 118 scales the pixel resolution of the progressive video signal (i.e. the same pixel resolution of the original interlaced digital video signal) to the pixel resolution of the progressive monitor 64 by trimming, stretching and linear interpolation. The scaled progressive video signal is provided by the video scaler 118 through another multiplexer 126 to the video DAC 120. The video DAC 120 converts the scaled progressive video signal from a digital signal to an analog signal, which can be played back on the progressive monitor 64. In this manner, the full resolution capability of DVD content is preserved and presented on the progressive monitor 64 for the user's enjoyment.

Additionally, since some currently available video DACs 120 are capable of handling the RGB component video standard signal from the video encoder 92, the RGB signal may be routed through path 128 and the multiplexer 126 to the video DAC 120 and then to an RGB connector (not shown) on the TV 62. The multiplexer 126 operates under the control of the host processor 82 to select which of the RGB signal or the scaled progressive video signal to send to the video DAC 120.

In addition to the DVD content, the video content from the other A/V channels that provide video content (the antenna 34, the cable 36, the satellite link 38 and the web 40, FIG. 1) can be played back with the progressive monitor 64. The antenna 34, cable 36 and satellite link 38 feed broadcast signals into the two TV tuners 66 and 68. With two TV tuners 66 and 68, the DVD player 30 can process two broadcast signals simultaneously. The TV tuners 66 and 68 connect to the host bus 96 to exchange control and programming instructions with the host processor 82 under the control of a tuner control program 130 (FIG. 3). The TV tuners 66 and 68 separate out analog video and audio signals from the broadcast signal and provide the analog video signals to video ADCs 70 and 72, respectively, and provide the analog audio signals to audio ADCs 74 and 76, respectively. The video ADCs 70 and 72 and the audio ADCs 74 and 76 convert the analog video and audio signals into digital video and audio signals, which can be processed by the digital components of the DVD player 30. The digital audio signal is typically a stream of PCM signals, as is the decoded digital audio content provided by the DVD decoder 90, as described above.

Web broadcast programming originating from the web 40 (FIG. 1) is "streamed" across the communication link 60 and received by the communication interface 78. The web broadcast programming is provided in a digital format. In fact, there are currently several streaming video and audio formats available for sending digital A/V content over the web 40. The incoming digital A/V content is sent by the communication interface 78 through the host bus 96 to the host processor 82. The web browser program 80 running on the host processor 82, sometimes with the aid of a web "plug-in" program (not shown), performs necessary decoding and/or decompressing of the digital A/V content to form digital video and audio signals which can be processed by the DVD player 30. The digital audio signal is typically a stream of PCM signals, as is the decoded digital audio content provided by the DVD decoder 90, as described above. The digital video signal is provided at a digital video output 132 of the host processor 82, and the digital audio signal is provided at a digital audio output 134 of the host processor 82. Alternatively, the host processor 82 could output the digital video and audio signals to the host bus 96, which is connected to the CC data slicer 124 and a digitized audio processing unit 140 to send the digital video and audio signals thereto as described below.

The digital video signal from the video ADCs 70 and 72 or the digital video output 132 share a signal path 136 to the CC data slicer 124 and the optional A/V encoder 108. The CC data slicer 124 processes the CC content portion of the digital video signal as described below and passes the video portion of the digital video signal through the multiplexer 122 to the de-interlacing unit 116. The de-interlacing unit 116, the video scaler 118 and the video DAC 120 process the digital video signal, as described above, to play the video content on the progressive monitor 64. In this manner, the DVD player 30 plays the video content of the broadcast programming on the progressive monitor 64, instead of on the TV 62. Alternatively, the DVD player 30 could have the capability to play the video content on the TV 62, too, as the CC content can be displayed.

The digital audio signal from the audio ADCs 74 and 76 or the digital audio output 134 share a signal path 138 to a digitized audio processing unit 140 and the optional A/V encoder 108. The digitized audio processing unit 140 captures and processes the audio content as described below and passes the digital audio signal through another multiplexer 142, which selects between the digital audio signal from the digitized audio processing unit 140 and the compact disk input 32, to the DVD decoder 90. Since the digital audio signal is typically a PCM signal, the DVD decoder 90 essentially passes the digital audio signal through to the audio DAC 94 for playing the audio content on the speakers 54, as described above. Given the popularity of karaoke, however, passing the audio content through the DVD decoder 90 enables the ability to add karaoke features, with a microphone (not shown), to broadcast video, as well as existing DVD karaoke features.

For recording the broadcast programming, the A/V encoder 108 intercepts the digital video and audio signals sent on the signal paths 136 and 138, respectively. When programmed and activated, the A/V encoder 108 compresses and encodes the digital video and audio signals into DVD-encoded bitstream according to DVD formatting standards. The DVD-encoded bitstream is sent to the multiplexer and track buffer 110, which multiplexes together the video and audio portions of the DVD-encoded bitstream and buffers the DVD-encoded bitstream in preparation for sending it to the DVD drive 42 for storage on the re-writable DVD disk 48. Alternatively, if re-writably is not available for the DVD disk 48, then the A/V content can be recorded on an analog video tape recorder (not shown) that intercepts the analog signals sent to the TV 62, progressive monitor 64 and speakers 54.

The CC data slicer 124 extracts the CC content from the digital video signal of the broadcast programming before passing the digital video signal to the de-interlacing unit 116. The CC data slicer 124 is connected to the host bus 96 to exchange control and programming signals with the host processor 82 under control of a CC and sub-title processing program 170 (FIG. 3). Alternatively, the CC data slicer 124 may be connected to the DVD decoder 90 to receive control signals, and the DVD decoder 90 may be programmed by the host processor 82 under the control of the CC and sub-title processing program 170 by placing control data in host regions 172 within the DVD decoder 90 instructing the DVD decoder 90 on how to control the CC data slicer 124. The CC data slicer 124 also sends extracted CC content through the host bus 96 to a processing memory RAM 174 for storage. Alternatively, the processing memory RAM 174 may be part of the host memory RAM 86. For the CC data slicer 124 to capture CC content from more than one broadcast program, the TV tuners 66 and 68 are programmed to scan through several channels (e.g. 30 channels) by sequentially tuning to each channel and sending video content for each channel to the CC data slicer 124, wherein the CC content for each channel is extracted and sent to the processing memory RAM 174 for storage. Channel scanning for CC content also permits simultaneous display of the CC content from multiple channels on the display 56 (FIG. 1). The CC content is displayed horizontally or vertically (e.g. for Chinese or Japanese characters) on any area of the display 56. Since the CC content and video content are stored in the processing memory RAM 174, the video frames can be repeated, with text scrolling updated by the host processor 82. "Thumbnail" still images can be displayed underlaying the multiple channels' CC content if desired.

A typical analog CC signal 144 is shown in FIG. 4. The analog CC signal 144 is digitized through the video ADCs 70 and 72, so the CC data slicer 124 receives and processes a digitized version of the CC signal 144. Two bytes 146 and 148 of CC content are provided with each video frame on line 21 of the video signal during the vertical blanking interval. The two bytes 146 and 148 each have seven digital bits (D0–D6) 150 and one parity bit 152. The two bytes 146 and 148 follow a start bit 154. The start bit 154 follows seven clock cycles 155, on which the CC data slicer 124 synchronizes after detecting a horizontal synchronization (Hsync) signal 156 and program color burst signal 158.

A block diagram of the CC data slicer 124 is shown in FIG. 5. A level shift unit 160 and a synchronization separator 162 both receive the digital video signal. The level shift unit 160 creates a serial bitstream from the digital video signal. The synchronization separator 162 synchronizes on the seven clock cycles 155 and sends a signal to a bit clock recovery unit 164 to generate a clock signal from the clock cycles 155. With the clock signal and the serial bitstream, a data detector 166 detects the data bits 150 and parity bits 152. With the data bits 150 and the parity bits 152, a byte extractor 168 generates the two bytes 146 and 148 (CC Data1 and CC Data2) of CC content. When the CC data slicer 124 has extracted the two bytes 146 and 148 of CC data, a CC interrupt signal 176 is generated to request access to the processing memory RAM 174 (FIG. 2) to store the two bytes 146 and 148.

Returning to FIG. 2, the digitized audio processing unit 140 receives the stream of PCM signals (digital audio signal) of the broadcast programming and stores a portion of the stream of PCM signals in the processing memory RAM 174 under control of an audio processing program 178 (FIG. 3) running on the host processor 82. Thus, the digitized audio processing unit 140 connects to the host bus 96 to exchange control and programming signals with the host processor 82 and to send the PCM signals to the processing memory RAM 174.

A capture and filter unit 180 receives a video signal from the CC data slicer 124 upon command from the host processor 82 under control of a capture-still program 182 (FIG. 3). The capture and filter unit 180 captures a single frame, or still image, of the video content on a programmed time and/or type of text match. The capture and filler unit 180 stores the captured still in the processing memory RAM 174 along with stored CC and audio content. To save space in the processing memory RAM 174, the capture and filter unit 180 preferably filters the captured stills to a smaller size, such as a ¼ SIF (Source Input Format) file, common in some video compression techniques. Alternatively, the host processor 82 could filter the captured stills with software programming. Thus, the capture and filter unit 180 connects to the host bus 96 to exchange control and programming signals with the host processor 82 and to send the captured stills to the processing memory RAM 174.

A flow chart for an exemplary procedure for setting up and launching channel scanning and searching by a setup and launch program 184 (FIG. 3) running on the host processor 82 is shown in FIG. 6. The procedure starts at step 186. At step 188, the user is prompted with a menu screen (not shown) to select the channels to be scanned. The channels may be broadcast programming from the antenna 34, cable 36 or satellite link 38 (FIG. 2) or web broadcast programming from the web 40 (FIG. 1) or DVD content from the DVD disk 48 (FIG. 2) or a combination thereof. The user may select a range of channels (e.g. channels 2 through 45) or particular channels (e.g. channels 2, 5, 14–27, and web site www.webcastprograms.com (a fictional web address)).

At step 190, the user is prompted to select whether the CC, audio and/or video stills of the channels are to be searched while scanning or merely stored in the processing memory RAM 174 (FIG. 2) for later use. If automatic searching is not to be done at this time, then at step 192, the user is prompted to select whether to simultaneously display the text of the CC content for each of the selected channels, so that the user can manually search for desired programming by reading the CC content. The user may also select for formatting and font of the CC content to be displayed. If the user does not want to manually search the CC content, then background scanning is enabled, so the user can view other available programming under the control of a view A/V selection program 193 (FIG. 3), which permits the A/V content of a selected channel to pass through the DVD player 30 to the TV 62 or progressive monitor 62 while the DVD player 30 (FIG. 2) scans and stores or otherwise processes the CC and/or A/V content of the channels selected in step 188. Additionally, background scanning and storage of the CC content for one or more channels permits the user to access the CC content later, either to perform many different searches for different criteria within the stored CC content of several channels or to manually view the CC content of a single channel at any desired pace at which the user can comfortably read the CC content. Typically, automatic searching performed during real-time scanning of the CC content is performed in the background, so the user can view other available programming under the control of the view A/V selection program 193 while the DVD player 30 performs the automatic scanning, storing and searching. Then the procedure proceeds to step 194 to continue setting up the hardware and software of the DVD player 30 (FIG. 2) for scanning and storing.

If searching is to be performed at this time, however, (i.e. the determination at step 190 is positive) then the user is prompted to enter search criteria for CC content (text), audio content and/or video stills at step 196. Common text search techniques are applied to the CC content to search for keywords, key phrases or groups of words in natural language or boolean searches selected by the user at step 196. Since the CC content is received over time, the search techniques may search for matches within a time interval, such as a group of words that occur within the same one-minute time period. Thus, the text searching may be applied to the CC content of an entire program or to only the CC content received in the latest time interval to find the user's desired programming.

For audio content searching, the users enters audio criteria at step 196 for the DVD player 30 (FIG. 2) to search for distinct changes in the audio content or for matches to predetermined audio segments. Changes in the audio content may be indicated by a sudden change in the base average amplitude of the audio content, so that the base average amplitude of the most recent two or three seconds of audio content shows a definite difference when compared to the base average amplitude of the most recent one minute. For example, background "white noise" due to spectators at a sporting event may cause the base average amplitude of the audio content to be greater than it would be without the background white noise. This noise is stored and used as a reference. Thus, when a sporting event program switches to a commercial, in which there is no background white noise, there is a detectable change in the base average amplitude, and the DVD player 30 (FIG. 2) may be programmed for a particular response, such as a pause in recording the program. Likewise, when the white noise returns as compared to the stored reference noise, the DVD player 30 may respond by restarting the recording of the program. In this manner, program changes can be detected, and the DVD player 30 can response appropriately. With respect to matches to predetermined audio segments, the DVD player 30 compares the latest segment of a broadcast program with the predetermined segment to find a match, or a match within a predetermined tolerance. Algorithms for such comparisons are conventional and typically determine either a signal-to-noise ratio (SNR) or mean square error (MSE) between the PCM signals of the two audio segments. Thus, the DVD player 30 can search for programming that contains or is preceded by a known audio signal, such as a tone or a few bars of a theme song or the white noise of spectators at a sporting event. At step 196, the user can upload the predetermined audio segment to the DVD player 30, or the user can record the predetermined audio segment from a previous playing of the desired program and store the segment in the DVD player 30, or the user can select a pre-installed audio segment that was installed in the DVD player 30 by the manufacture.

For video still searching, the user programs the DVD player 30 (FIG. 2) at step 196 to capture (by the capture and filter unit 180, FIG. 2) and store (in the processing memory RAM 174, FIG. 2) still images from video content upon a direction to do so, such as a response to a match in a search of CC or audio content. The DVD player 30 then compares the captured still image with a predetermined image for a match, or a match within a predetermined tolerance. For example, for certain types of sporting events, the captured still image may be compared to a green image to find sporting events played on a grass or grass-like field. Thus, the user can instruct the DVD player 30 at step 196 to search for the white noise that may indicate spectators at a sporting event, and, upon a match, further search for a green field to better limit the overall search results. Algorithms for such comparisons are conventional and, again, typically determine either an SNR or MSE between the images.

At step 198, the user is prompted to enter programmed response instructions for the DVD player 30 (FIG. 2) to take under the control of a match response program 200 (FIG. 3) running on the host processor 82 (FIG. 2) upon finding a match in the search criteria specified in step 196. The user may specify that the DVD player 30 is to stop further scanning and to alert the user by switching immediately, under control of the view A/V selection program 193 (FIG. 3), to displaying on the TV 62 or progressive monitor 64 (FIG. 2) the video content of the channel that generated the match. Alternatively, the user may select to be alerted by a presentation of the CC content of the matched channel or by a simple audible or visible signal or by a presentation of the CC content followed by a switch to the matched channel after a delay sufficient for the user to read the CC content that generated the match.

Additionally, the DVD player 30 may automatically start recording a transcript of the CC content of the matched channel under control of a record text program 202 (FIG. 3) running on the host processor 82 (FIG. 2), which stores the CC content of the matched channel in a portion of either the processing memory RAM 174 or the host memory RAM 86 (FIG. 2). The user may specify selective saving of the CC content, wherein a portion of the CC content is stored, such as a predetermined number of minutes or words before or after the point of a search match. Selective saving may also exclude certain portions of CC content known not to be of interest to the user, such as names of products, which may indicate the presence of a commercial within the CC content. Filtering out product names in a list of products may remove many undesired commercials from the stored CC content. Search matches can also be indexed according to the time of occurrence, the number of times that the same match occurred in the same program and/or the channel in which the match occurred. The order of saved words, phrases and/or sentences can be time lapse based, chronologically based, web search engine based and/or real-time clock based.

Also, the DVD player 30 may automatically start recording the A/V content of the matched channel under control of a record A/V program 204 (FIG. 3) running on the host processor 82 (FIG. 2), which controls either of the TV tuners 66 or 68 (FIG. 2) or the web browser 46 (FIG. 1) as well as the A/V encoder 108, the multiplexer and track buffer 110 and the DVD drive 42 (FIG. 2) to capture the desired A/V content of the matched channel and store the A/V content to the DVD disk 48 (FIG. 2) if the DVD disk 48 is re-writable.

Another programmed response alternative is to capture, by the capture and filter unit 180 (FIG. 2) under control of the capture still program 182 (FIG. 3), a video still image in the video content, instead of the entire A/V content, at the time of a match in either CC content or audio content. Further responses may be to present the video still image to the user to manually determine whether the search match found a desired program, or to compare the video still image to a predetermined image for a match, as described above.

The programmed response may also rank multiple search matches according to the user's priority for saving, searching or displaying the search matches. Such priority may be entered at step 198 or with the search criteria at step 196 and essentially specifies a preference in search criteria, such as a preference for finding one keyword or phrase or sentence over other specified words or groups of words, or a preference for one channel over other specified channels, or a preference for a video still image having a lower SNR or MSE than other video still images in comparison to a predetermined image, or a preference for a match occurring at a particular time, or a preference for a search result that includes a video still image as opposed to one that does not include a video still image. Thus, the user may specify at step 196 a search for an advertisement for any film starring a particular actor, but with a preference for a particular film, so that the programmed response displays the results with the particular film listed first, if available, and any other film starring the particular actor listed thereafter. Additionally, the programmed response may automatically prompt the user or switch the displayed channel upon any criteria being met, including a particular priority level for a search match.

The above described options for scanning, storing, searching and displaying CC content may also be performed on an automatic translation of the CC content into a predetermined language. In this option, a translation program 210 (FIG. 3) running on the host processor 82 (FIG. 2), such as a conventional translation program, receives the CC content and translates it into the predetermined language for one or more of the scanned channels prior to searching or displaying the CC content. Additionally, since the DVD standards provide for up to eight tracks of sub-titles for eight languages, another option is for the CC search capabilities of the DVD player 30 (FIG. 2) to be applied to any of the tracks of sub-titles in any available language and to any automatic translation thereof. Further, multiple lines of any language's text is presented on the display 56 (FIG. 1).

At step 206, a search engine 208 (FIG. 3) is initialized with the criteria specified for searching for CC content (TEXT), audio content (AUDIO) and/or video still images (STILLS). If searching is to be performed while the DVD player 30 is scanning the CC and/or A/V content of any of the channels, then the search engine 208 monitors the stored CC and/or A/V content for a sufficient quantity of data on which to perform the specified searches.

At step 194, the CC data slicer 124 (FIG. 2) is configured with information related to the channels to be scanned, so the CC data slicer 124 can multiplex between the selected channels to extract the CC content. Typically the CC data slicer 124 is also configured to store the CC content in the processing memory RAM 174 with time and channel indexing, but the CC data slicer 124 is optionally configured to store the CC content with any other formatting or indexing as described above. Further, the CC data slicer 124 is configured with information related to the channel for which the A/V content is to be passed through to the multiplexer 122 in the event that one of the channels is to be viewed by the user while other channels are being scanned.

At step 212, the digitized audio processing unit 140 (FIG. 2) is configured with information related to the selected channels to be scanned for audio content. The digitized audio processing unit 140 is typically configured with the amount (i.e. number of seconds or minutes) of audio content to maintain for each selected channel, the relative or absolute time of the occurrence of the audio content and the channel on which it occurred.

At step 214, the capture and filter unit 180 (FIG. 2) is configured with information related to the formatting and storage of the video still images to be captured. The capture and filter unit 180 doesn't actually capture the video still images until instructed to do so by the capture still program 182 (FIG. 3) running on the host processor 82 (FIG. 2). The capture still program 182 also instructs the CC data slicer 124 to route the relevant video content to the capture and filter unit 180, so the capture and filter unit 180 can capture the video still image from the video content.

At step 216, the processing memory RAM 174 (FIG. 2) is configured with information to set aside portions of memory space for the CC and/or A/V content which will be stored therein. Memory space is allocated for each channel to be scanned. Memory space for storing results is allocated in either the processing memory RAM 174 or the host memory RAM 86 (FIG. 2).

At step 218, the TV tuners 66 and 68 (FIG. 2), the web browser 46 (FIG. 1) and/or the DVD decoder 90 (FIG. 2) are configured with information related to the channels to be scanned. The TV tuners 66 and 68 are configured with information related to the selected channels, so the TV tuners 66 and 68 can sequence through the selected channels under the control of the tuner control program 130 (FIG. 3) running on the host processor 82 (FIG. 2). In this manner, the TV tuners 66 and 68 provide CC and A/V content for each channel to the CC data slicer 124 (FIG. 2) and the digitized audio processing unit 140 (FIG. 2). The web browser 46 is configured with information related to selected web sites or A/V content available via the web, so the web browser program 80 (FIG. 3) can to issue web access requests to selected channels, or web sites, to provide A/V content for scanning and searching. The DVD decoder 90 is configured with information related to a DVD title to be played back from the DVD disk 48 (FIG. 2), so the DVD decoder 90 can provide the DVD content on the installed DVD disk 48 for scanning and searching. Alternatively, one of the TV tuners 66 or 68, the web browser program 80 or the DVD decoder 90 is configured to provide the full A/V content of at least one of the available channels for viewing on the TV 62 or progressive monitor 64 (FIG. 2), while the other available channels are scanned.

At step 220, the hardware and software of the DVD player 30 (FIG. 2) has been set up, so the scanning of the selected channels begins. In other words, the TV tuners 66 and 68, the web browser program 80 and/or the DVD decoder 90 begin sending CC and A/V content for scanning. Thus, the scanning, CC extracting, audio processing, video still image capturing and searching proceed as outlined above with selected responses. The setup and launch procedure ends at step 222.

After launching channel scanning at step 220, the TV tuners 66 and 68 proceed with sequencing through each of the selected TV channels according to an exemplary process shown in FIG. 7. The procedure starts at step 224. At step 226, the TV tuners 66 and 68 tune to the first channel of the selected channels. Typically, the TV tuners 66 and 68 will each be provided with half of the selected channels through which to scan, so at step 226, each TV tuner 66 and 68 will tune to a different channel at which to start scanning.

At step 228, line 21 of the video content (i.e. the line on which the CC content is transmitted) of the current channel is read. At step 230, the data read at step 228 is sent to the CC data slicer 124 (FIG. 2). Step 230 may include some form of arbitration for control of the signal path 136 (FIG. 2). At step 232, it is determined whether the current channel is the last channel in the selected channels. If not, then at step 234, the current channel is incremented to the next channel in the selected channels, and the procedure branches back to step 228 to perform the above steps 228 and 230 for the next channel. When the TV tuners 66 and 68 have sequenced through all of the channels, i.e. the determination at step 232 is positive, then it is determined at step 236 whether the channel scanning is to stop. If so, then the procedure ends at step 238, but if not, then the current channel is reset at step 240 to the first channel, and the procedure branches back to step 228 to sequence through each of the selected channels again. In this manner, the TV tuners 66 and 68 scan through each of the selected channels and pass the CC signal 144 (FIG. 4) for each channel through the video ADCs 70 and 72 (FIG. 2) to the CC data slicer 124 (FIG. 2) for extraction of the CC content contained in the CC signal 144. A signal for the channel scanning to stop at step 236 may originate automatically within the DVD player 30 (FIG. 2) as a predetermined response to a search match or manually from the user interacting through the RCU 50 or keyboard 52 (FIG. 2).

A flow chart is shown in FIG. 8 for an exemplary procedure to extract the CC content by the CC data slicer 124 (FIG. 2) and store the CC content to the processing memory RAM 174 (FIG. 2) under control of the CC and sub-title processing system 170 (FIG. 3) running on the host processor 82 (FIG. 2). The procedure starts at step 242. At step 244, the CC data slicer 124 (FIG. 2) inputs the channel for the CC content currently available on the signal path 136 (FIG. 2), so the extracted CC content can be correlated with previously extracted CC content for the same channel when storing the CC content to the processing memory RAM 174. To avoid synchronization problems between the TV tuners 66 and 68 (FIG. 2) and the CC data slicer 124, it is preferable to provide data indicating the channel along with the CC content by the TV tuners 66 and 68 across signal path 136. In an alternative, the CC data slicer 124 independently keeps track of the channel by incrementing and resetting the channel in a manner similar to that described in the tuner function procedure shown in FIG. 7.

At step 246, the CC data slicer (FIG. 2) inputs the CC signal 144 (FIG. 4) from the TV tuner 66 or 68 (FIG. 2). At step 248, the CC data slicer 124 extracts two bytes of CC content from the CC signal 144, as described with respect to FIGS. 4 and 5. The CC data slicer 124 stores, at step 250, the two bytes of CC content in the processing memory RAM 174 (FIG. 2) along with time and channel information, or a "time stamp" and "channel stamp," so the search engine 208 (FIG. 3) can perform time and/or channel based searches. At step 252, it is determined whether the channel scanning is to stop, similar to step 236 (FIG. 7) in the tuner function procedure. If not, then the procedure branches back to step 244 to go to the next channel in the selected channels and extract the CC content from that channel. If the determination at step 252 is positive, that the channel scanning is to stop, then the procedure ends at step 254.

A flow chart for an exemplary procedure for performing searching functions by the search engine 208 (FIG. 3) is shown in FIG. 9. The procedure starts at step 256. At step 258, the search engine 208 is set to the first channel in the selected channels for searching. The search criteria was specified by the user at step 196 (FIG. 6) of the setup and launch procedure and entered into the search engine 208 when the search engine 208 was initialized at step 206 (FIG. 6) of the setup and launch procedure. The CC content was stored, if desired, in the processing memory RAM 174 (FIG. 2) according to the CC extraction procedure shown in FIG. 8. Likewise, the audio content and video still images were stored, if desired, in the processing memory RAM 174 according to the configuration of the digitized audio processing unit 140 (FIG. 2) and the capture and filter unit 180 (FIG. 2), respectively. Thus, at step 260, the search engine 208 perform an appropriate search algorithm using the entered search criteria and the stored CC and A/V content.

At step 262, it is determined whether the search engine 208 generated a match at step 260. If not, at step 264, it is determined whether the current channel is the last channel in the selected channels for scanning and searching. If not, then the current channel is incremented to the next channel at step 266, and the procedure branches back to step 260 to perform a search on the new current channel. If the determination at step 264 was positive, however, then at step 268, it is determined whether the searching is to stop. A signal to stop searching may originate from a variety of sources. For example, if the search engine 208 (FIG. 3) has searched the CC and A/V content for the last of the selected channels and no new CC or A/V content has been stored in the processing memory RAM 174 (FIG. 2), then the search engine 208 may stop itself. As another example, the use may enter a stop searching signal through the RCU 50 or keyboard 52 (FIG. 2). If the determination at step 268 is negative, i.e. the searching is not to stop, then at step 270, the current channel is reset to the first channel, and the procedure branches back to step 260 to continue searching through the selected channels again. If the determination at step 268 is positive, however, then the procedure ends at step 272.

If the determination at step 262 was positive, i.e. a match occurred in the search algorithm, then at step 274, it is determined whether the scanning is to stop upon a match. If so, then stop scanning signals are issued at step 276 to stop the TV tuners 66 and 68, the web browser program 80, the DVD decoder 90, the CC data slicer 124, the digtzed audio processing unit 140 and the capture and filter unit 180 (FIG. 2) from continuing to scan through the selected channels and from continuing to capture CC and/or A/V content.

At step 278, the programmed response entered by the user at step 198 (FIG. 6) of the setup and launch procedure is performed by the DVD player 30 (FIG. 2) under control of the match response program 200 (FIG. 3). The response may be one or more of any appropriate responses, including those described above. Additionally, the match response program 200 simply saves the search results to the host memory RAM 86 or the processing memory RAM 174 with indexing for matched keyboards or groups of words, frequency of match or save within a predetermined time period or single program, and/or an absolute real time occurrence of each match or a time relative to a starting point, such as the beginning of a program. The user can then view the search results at any time.

At step 280, it is determined whether the search engine 208 (FIG. 3) is to stop searching, such as when the programmed response includes stopping at the first search match, or no further CC or A/V content is being captured and stored, or the user inputs a stop search command from the RCU 50 or keyboard 52 (FIG. 2). If searching is to stop, then the procedure ends at step 272. If searching is to continue, i.e. the determination at step 280 is negative, then at step 282, it is determined whether the search engine 208 has completed searching the current channel. If not, then the procedure branches back to step 260 to continue performing the search algorithm with the search criteria and the CC and/or A/V content of the current channel, starting where the searching left off at the point of the previous match. If the search engine 208 has completed searching the current channel, i.e. the determination at step 282 is positive, then the procedure branches back to step 264 to continue to the next channel for searching.

The DVD player 30 (FIG. 2) provides the advantage of scanning multiple channels of CC and A/V content, where the channels include TV broadcast channels, web broadcast programming and/or installed DVD content, to assist a user in finding desired programming or information. Additionally, DVD subtitles can be treated in the same manner as CC content. The CC and/or A/V content is captured, stored, indexed and searched in a variety of ways to enhance the flexibility with which the user uses it. The user can enter text search criteria for a keyword, group of words or other form of text in the CC content of a set of channels. The user can also enter audio search criteria for a change in audio playback, indicating a change in programming, or a match between audio playback and a stored audio clip, indicating similar content. The user can also enter video search criteria for comparison to video still images captured upon a match in either text or audio searching. The search criteria can also specify a particular time or time period within the A/V content at which the matching CC or A/V content must occur. Further, the search criteria can specify one or more channels in which the match must occur.

The DVD player 30 can simply record all of the CC content for each of the selected channels, without or without performing any searches, for a selected time period, until running out of space in the processing memory RAM 174 for storing the CC content or until the user inputs a stop-scanning signal. Stored CC content can be searched repeatedly with a variety of search criteria, including, but not limited to, searching for a text string match at a user-specified frequency. Alternatively, the user can view the stored CC content for any one or more of the selected channels at any speed selected for the user's reading abilities. The user may also view the CC content for one or more selected channels in real-time as the CC content is captured. The format for displayed (or saved) text may be based on the text content or the search criteria. Options to display the text on selected channels per program or per a pre-selected format may be selected. Default display formats are stored in the host memory RAM 86. User-selected options (for each user) for each display format are also stored. Priorities for display formats are queued and recorded in the host memory RAM 86. Additionally, CC content can be translated, and the translation can be searched or presented for the user's viewing.

The DVD player 30 (FIG. 2) can monitor the audio content of a selected channel to calculate a base average amplitude for the audio content over a period of time. A change in the base average multiple beyond a predetermined threshold for the most recent 2–3 seconds of audio content signifies a possible change in the program, so the DVD player 30 can either stop or start recording the A/V content, as desired, or switch channels to or from the selected channel. The DVD player 30 can also compare the audio content for a selected channel to an audio clip to search for a possible match.

The DVD player 30 (FIG. 2) also permits the user to specify one or more responses which the DVD player 30 is to take upon a match in the search criteria and can prioritize matches and responses. The user can select to be alerted with a visible or audible signal that a match has occurred, so that the user can manually perform the next response. Scanning and/or searching can be stopped upon a match. The DVD player 30 can immediately switch to displaying the channel and program that generated the match to delay the switch long enough to present the CC content that generated the match for the user to view prior to the switch, so that the user can see whether the match was proper. The DVD player 30 can present the CC content that precedes and/or follows the matching CC content by a predetermined number of words or time period, so that the user can view the context of the matching CC content. The DVD player 30 can start recording a transcript of the CC content of the channel wherein the match occurred and continue to the end of the program. The DVD player 30 can start recording the A/V content of the channel wherein the match occurred. Upon a match in either the CC or audio content, the DVD player 30 can capture a video still image in the video content at about the point of the match and either present the video still image to the user or compare the video still image to a selected image to determine whether there is a match between the two images. The DVD player 30 can also present the CC content along with video still images that correspond to the CC content either at a particular point within the overall A/V content or for the A/V content of an entire program with video still images captured periodically throughout the program.

Furthermore, the CC and A/V content and search information is displayed on either a TV or a progressive monitor. The progressive monitor provides an image clarity not available with conventional TVs. Therefore, the DVD player 30 (FIG. 2) provides enhanced viewing capabilities beyond those available in conventional DVD players.

Presently preferred embodiments of the invention and its improvements have been described with a degree of particularity. This description has been made by way of preferred example. It should be understood that the scope of the present invention is defined by the following claims, and should not be unnecessarily limited by the detailed description of the preferred embodiments set forth above.

The invention claimed is:

1. A device for receiving and playing back audio/visual (A/V) content selected from one of a plurality of different simultaneously and continuously supplied sources of A/V content, comprising:
   a receiver connected to receive the A/V content from each of the different A/V content sources and including at least one A/V signal convert to convert the A/V content received from each of the A/V content sources into corresponding digital A/V signals, the digital A/V signals including an audio portion and a video portion;
   a display circuit coupled to each receiver to receive the digital A/V signals, the display circuit including video encoding circuitry for converting the video portion of the received digital A/V signal into a video display signal, the display circuit including audio encoding circuitry for converting the audio portion of the received digital A/V signal into an audio display signal, the display circuit supplying the video and audio display signals for use in creating an A/V display of the A/V content of each digital A/V signal;
   a content capture unit coupled to each receiver to receive and capture a portion of the digital A/V signals corresponding to the A/V content from all of the A/V sources, the content capture unit comprising at least one of a close caption (CC) data slicer or a digitizing audio capture unit or a video still image capture unit, the CC data slicer extracting CC content from the digital A/V signals from each of the A/V sources as the captured portion of the A/V contents, the digitized audio capturing unit extracting audio content from the digital A/V signals from each of the A/V sources as the captured portion of the A/V content, and the video still image capture unit extracting a still image from the digital A/V signals from each of the A/V sources as the captured portion of the A/V content;
   storage memory coupled to the content capture unit to receive and store the captured portions of the digital A/V signals in a captured content segment of the storage memory, the storage memory also selectively coupled to the receivers to selectively receive and store the digital A/V signals in a full content segment of the storage memory, the storage memory further including an instruction segment for recording operating instructions;
   a processor connected to the storage memory and each receiver; and
   a user input device connected to the processor and the storage memory by which to supply user-selected search criteria and user-selected response criteria to the storage memory and the processor;
   the processor responding to the operating instructions recorded in the instruction segment of the storage memory and the search and response criteria to operatively;
      cause each receiver to receive the A/V content from each of the different A/V content sources in a scan sequence;
      send the corresponding digital A/V signals supplied by each receiver from each of the different A/V content sources during the scan sequence to the content capture unit to enable the content capture unit to extract the captured portion of the A/V content from each of the different A/V sources during the scan sequence;
      store the extracted captured portions of A/V content for each of the different A/V content sources in the captured content segment of the storage memory;
      search through the extracted captured portions of A/V content in the captured content segment of the storage memory in accordance with the search criteria;
      locate a match between the search criteria and at least one of the stored extracted captured portions of A/V content to thereby identify and select an A/V source containing A/V content correlated to the search criteria;
      controlling each receiver and the storage memory to execute one of a plurality of different response actions in response to the user-selected response criteria, the response actions including recording in the full content portion of the storage memory the corresponding digital A/V signals from the selected A/V source for subsequent use by the display circuit to create a display, and supplying the corresponding digital A/V signals from the selected A/V source to the display circuit to create an instantaneous display of the AV content from the selected AV source substantially simultaneously with the continuous supply of A/V content from the selected AV content source.

2. A device as defined in claim 1, wherein:
the CC data slicer receives the video portion of the digital A/V signals and captures and extracts the CC content from the video portion;

the digitizing audio capturing unit receives the audio portion of the digital A/V signals and captures and extracts the audio content from the audio portion; and the video still image capture unit receives the video portion of the digital A/V signals and captures and extracts the video still image part of the video portion.

3. A device as defined in claim 1 wherein the user-selected search criteria comprises textual criteria related to the CC content captured by the CC data slicer, audio criteria related to the audio content captured by the digitizing audio capture unit, or video criteria related to the video still image captured by the video still image capture unit.

4. A device as defined in claim 1, wherein the response actions further include:
   causing a visible alert from the display circuit;
   causing an audible alert from display circuit;
   displaying the CC content from the selected A/V source;
   capturing the video still image from the selected A/V source; and
   recording the CC content part from the selected A/V source in the storage memory.

5. A device as defined in claim 1, wherein:
   the sources of A/V content comprise a DVD source, a broadcast programming source, and a web programming site.

6. A device as defined in claim 1, wherein:
   the sources of A/V content include at least all of a DVD source, a broadcast programming source, and a web programming site;
   one of the receivers comprises a DVD receiver for receiving DVD content from the DVD source;
   one of the receivers comprises a TV tuner for receiving broadcast programming from the broadcast programming source; and
   one of the receivers comprises a web browser for receiving web programming from the web programming site.

7. A device as defined in claim 6, wherein:
   the one receiver which includes the DVD receiver includes a DVD decoder within the DVD receiver;
   the one receiver which includes the TV tuner includes a video analog-to-digital converter (ADC) and the audio ADC; and
   the one receiver which includes the web browser includes a web browser program which operates the web browser.

8. A device as defined in claim 1, wherein the display circuit further comprises:
   a PAL/NTSC video encoder connected to at least one receiver.

9. A device as defined in claim 1, wherein the display circuit further comprises:
   progressive monitor video encoding circuitry including a de-interlacing unit connected to one receiver, a video scaler connected to the de-interlacing unit, and a video digital-to-analog converter (DAC) connected to the video scaler.

10. A method of processing audio/visual (A/V) content in an A/V device, comprising:
    providing a plurality of A/V channels each of which supplies different A/V content simultaneously and continuously with each of the other A/V channels;
    receiving an A/V signal describing the A/V content from each A/V channel;
    supplying the A/V signal from each A/V channel in a scan sequence which encompasses all of the plurality of A/V channels;
    capturing a portion of the A/V signal from each A/V channel during the scan sequence;
    selecting the captured portion of the A/V signal as one of a close caption (CC) portion, an audio portion, or a video still image storing the captured portion of the A/V signal;
    specifying search criteria;
    specifying response criteria;
    searching through the captured portions of the A/V signals from each of the A/V channels in accordance with the search criteria;
    locating a match between the search criteria and at least one of the captured portions of the A/V signals from each of the A/V channels to thereby identify and selected the A/V channel providing the A/V signals whose captured portion matches the search criteria; and
    executing a response action in response to the response criteria, the response actions including one of recording the A/V signals from the selected A/V channel for subsequent use in creating a display of the A/V content from the corresponding A/V signals from the selected A/V channel or supplying the A/V signals from the selected A/V channel and creating an instantaneous display of the A/V content from the corresponding A/V signals from the selected A/V channel.

11. A method as defined in claim 10, wherein the user search criteria comprises textual criteria related to the CC portion of the A/V signal, audio criteria related to an audio portion of the A/V signal, or video criteria related to the video still image of the A/V signal.

12. A method as defined in claim 11, wherein the video criteria constitutes a predetermined tolerance of differences between the video still image and characteristics of a desired image.

13. A method as defined in claim 11 further comprising:
    specifying save criteria for storing the captured portions, the save criteria are comprising at least one of a frequency for storing of the CC portion, a frequency for locating a match, predetermined amount of time of CC content stored before and/or after locating a match, or a time-based order of matched textual criteria.

14. A method as defined in claim 10, wherein the response actions further include at least one of providing a visible alert providing an audible alert;
    displaying the CC portion from the corresponding A/V signal from the selected A/V channel;
    displaying the video still imaging of the A/V signal from the selected A/V channel in which the match was located.

15. A method as defined in claim 14, further comprising:
    setting a priority for at least one of the response criteria and the search criteria.

16. A method as defined in claim 10, wherein the captured portion of the A/V signal for each A/V channel comprises CC content, and the method further comprises:
    displaying the CC content of the selected A/V channel for viewing.

17. A method as defined in claim 16, further comprising:
    displaying the CC content of more than one A/V channel for simultaneous viewing.

18. A method as defined in claim 16, further comprising:
    receiving the CC content from the selected A/V channel at a first rate; and
    displaying the CC content at a second rate different from the first rate.

19. A method as defined in claim 10, wherein the plurality of A/V channels includes at least one of a DVD source, a broadcast programming source, or a web programming site.

20. A method as defined in claim 10, wherein the plurality of A/V channels include at least all of a DVD source, a broadcast programming source, and a web programming site, and the method further comprises:

receiving DVD content from the DVD source as the A/V signal;

receiving broadcast programming from the broadcast programming source as the A/V signal; and receiving web programming from the web programming site as the A/V signal.

21. A method as defined in claim 20, further comprising:

searching the captured portion of the A/V signal of at least one broadcast programming source and at least one DVD source simultaneously.

22. A method as defined in claim 20, wherein the web programming includes a live A/V broadcast with CC content.

23. A method as defined in claim 20, wherein the broadcast programming includes the CC portion, and the method further comprises:

displaying karaoke features for the CC portion of the broadcast programming.

24. A method as defined in claim 10, further comprising:

displaying the A/V signal of the selected A/V channel through video encoding circuitry which is a selected from either a PAL/NTSC video encoder or a progressive monitor video encoding circuitry.

25. A method as defined in claim 24, wherein the A/V signal is digital, and the method further comprises:

upon selecting the progressive monitor video encoding circuitry, the displaying is achieved de-interlacing the A/V signal, scaling the de-interlaced A/V signal, and converting the de-interlaced A/V signal from a digital signal to an analog signal.

26. A method as defined in claim 10, wherein the A/V device comprises a digital versatile disk (DVD) player for playing back DVD content on a display, and the DVD player comprises:

a video encoding circuit comprising a digital video input, a video signal converter and a display signal output, the digital video input receiving a digital video signal, the video signal converter converting the digital video signal into a display signal, and the display signal output providing the display signal to the display;

a source of compressed DVD content, the source of compressed DVD content constituting one of the A/V channels;

a DVD decoder comprising a DVD input connected to the DVD content source and a DVD output connected to the digital video input of the video encoding circuit, the DVD input receiving the compressed DVD content, and the DVD output providing decoded DVD content decoded from the compressed DVD content; and a broadcast television (TV) tuner comprising a broadcast input and a program output, the broadcast input receiving multiple broadcast TV programs, each broadcast TV program constituting one of the A/V channels, and the program output connected to the digital video input of the video encoding circuit and providing a selected one of the multiple broadcast TV programs to the video encoding circuit;

and wherein:

the video encoding circuit converts either the selected TV program or the decoded DVD content into the display signal.

27. A method as defined in claim 26, wherein the DVD player further comprises:

a second broadcast TV tuner comprising a broadcast input and a program output, the broadcast input receiving the multiple broadcast TV programs, and the program output connected to the digital video input of the video encoding circuit and providing a second selected one of the multiple broadcast TV programs to the video encoding circuit;

and wherein:

the video encoding circuit converts the selected TV program first aforesaid, the second selected TV program or the decoded DVD content into the display signal.

28. A method as defined in claim 10, wherein the A/V device comprises a digital versatile disk (DVD) player for playing back a digital video signal on a conventional television or progressive monitor, the DVD player comprising:

a source of the digital video signal derived from the A/V signal of the selected A/V channel, the digital video signal being interlaced and having a source resolution; and a video encoding circuit comprising a digital video input, a video encoder, a de-interlacing unit, a video scaler, a video digital-to-analog converter (DAC) and a display signal output, the digital video input connected to the video encoder and the de-interlacing unit, the de-interlacing unit connected to the video scaler, the video scaler connected to the video DAC, and the video DAC connected to the display signal output;

and wherein:

the digital video input receives the digital video signal and provides the digital video signal to a selected one of either the video encoder or the de-interlacing unit;

the video encoder encodes the digital video signal into a conventional television signal having a first display resolution and provides the conventional television signal to the conventional television; and the de-interlacing unit de-interlaces the digital video signal into a progressive video signal, the video scaler scales the progressive video signal into a scaled video signal having a second display resolution, the video DAC converts the scaled video signal into a display signal, and the display signal output provides the display signal to the progressive monitor.

29. A method as defined in claim 28, wherein with respect to the DVD player:

the first display resolution is equal to or less than the source resolution; and the second display resolution is equal to or greater than the source resolution.

30. A method as defined in claim 28, wherein:

the source of the digital video signal comprises either a DVD source or a conventional broadcast television source.

31. A method as defined in claim 10, wherein the A/V device comprises a digital versatile disk (DVD) player for playing back the A/V signal from the selected A/V channel, the DVD player comprising:

a source of the A/V signal, the A/V signal comprising close caption (CC) content, audio content and video content, the source of the A/V signal being one of the plurality of A/V channels;

at least one content capture unit coupled to the source of the A/V signal, the content capture unit receiving at least a portion of the A/V signal and capturing part of the A/V signal, and each content capture unit comprising at least one of:
a CC data slicer;
an audio capture unit; or
a video still image capture unit;
a captured content storage unit coupled to the content capture unit and comprising memory storage space, the memory storage space receiving the captured part of the A/V signal from the content capture unit and storing the captured part of the A/V signal.

32. A method as defined in claim 31, wherein:
the source of A/V signals comprise a DVD source and a conventional broadcast television source.

33. A method as defined in claim 32, wherein:
the sources of A/V signal is further comprise a World Wide Web A/V source.

34. A method as defined in claim 10, wherein the A/V device comprises a programmable storage device readable by a machine and which tangibly embodies a program of instructions executable by the machine to process A/V content by executing the following:
providing the plurality of A/V channels;
receiving the A/V signal from each A/V channel;
capturing a portion of the A/V signal, wherein the portion of the A/V signal comprises one of a CC portion, an audio portion, a video still image; and
storing the captured portion of the A/V signal.

35. A method as defined in claim 34, wherein the programmable storage device:
scans through the plurality of A/V channels in sequence;
receives the A/V signal from each of the A/V channels during the sequence of scanning;
captures the portion of the A/V signal from each of the A/V channels; and
stores the captured portion of the A/V signal from each of the A/V channels.

36. A method as defined in claim 35, wherein the programmable storage device further:
searches through the captured portions of the A/V signals from each of the A/V channels to locate the match with the search criteria.

37. A method as defined in claim 36, wherein the search criteria comprises at least one of textual criteria related to the CC portion of each A/V signal, audio criteria related to an audio portion of each A/V signal, or video criteria related to the video still image of each A/V signal.

38. A method as defined in claim 35, wherein the captured portion of the A/V signal for each A/V channel comprises CC content, and the method further comprises:
displaying the CC content of each A/V channel for viewing.

39. A method as defined in claim 34, wherein the method further comprises:
using at least two different ones of a DVD source, a broadcast programming source, and a web programming site as the plurality of A/V channels.

40. A method for processing A/V content in an A/V device comprising the steps of:
providing an A/V channel;
receiving an A/V signal from the A/V channel;
capturing a portion of the A/V signal, wherein the portion of the A/V signal comprises a CC portion, an audio portion, a video still image, or a combination thereof;
storing the captured portion of the A/V signal;
providing one or more A/V channels comprising a DVD source, a broadcast programming source, and a web programming site;
receiving DVD content from the DVD source, receiving broadcast programming from the broadcast programming source, receiving web programming from the web programming site, or a combination thereof; and wherein:
the DVD content includes subtitle content which is played back at a first rate simultaneously with playback of the A/V content, the method further comprising:
capturing the subtitle content at a second rate that is faster than the first rate;
indexing the captured subtitle content; and
searching for matches within the indexed subtitle content.

* * * * *